May 24, 1949.　　　　　　　J. L. SELF　　　　　　2,471,244
BRAKING SYSTEM FOR MOTORCARS
Filed Nov. 21, 1946　　　　　　　　　　　　　　4 Sheets-Sheet 1
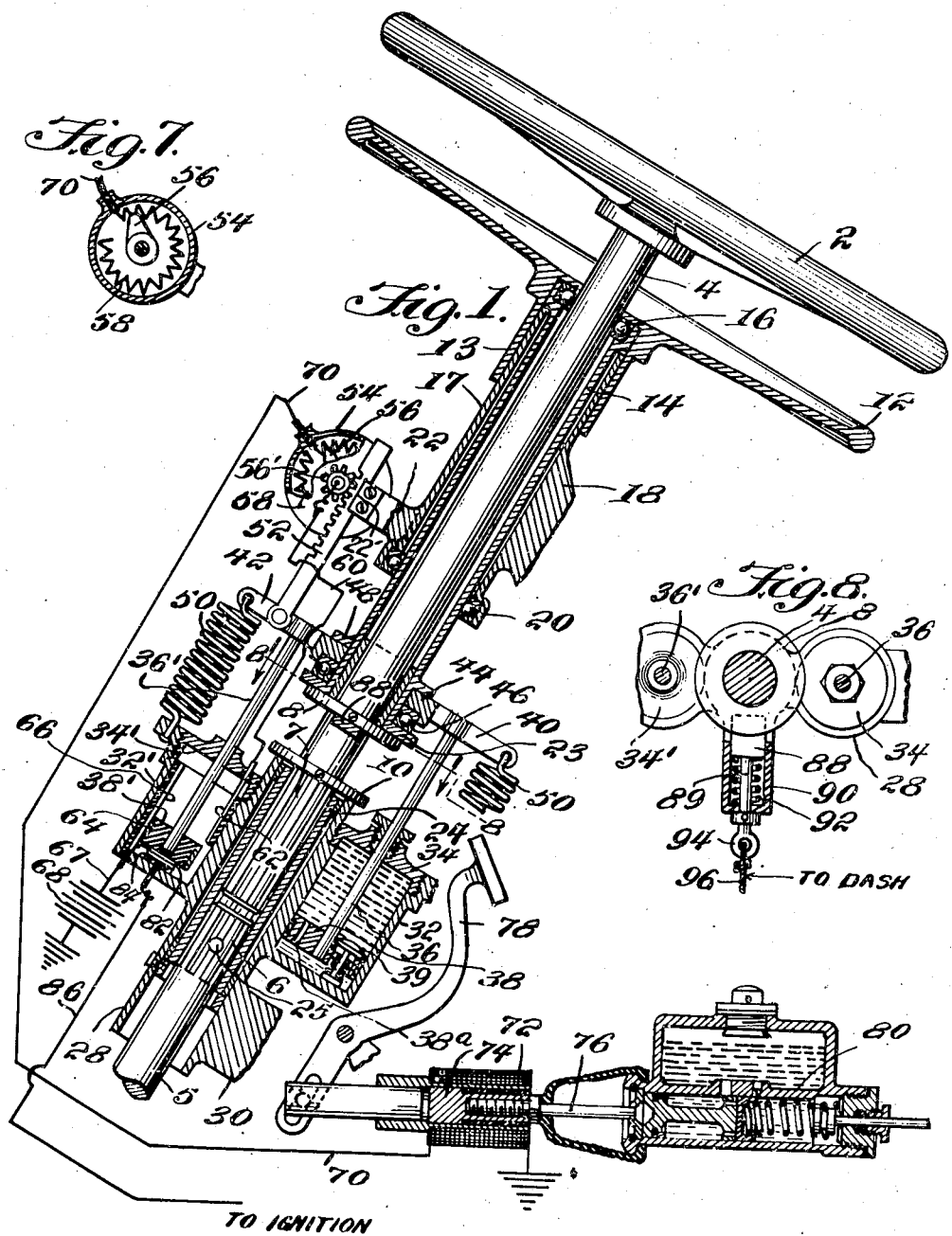
INVENTOR.
John L. Self,
BY Victor J. Evans & Co.
ATTORNEYS May 24, 1949.  J. L. SELF  2,471,244
BRAKING SYSTEM FOR MOTORCARS
Filed Nov. 21, 1946  4 Sheets-Sheet 2
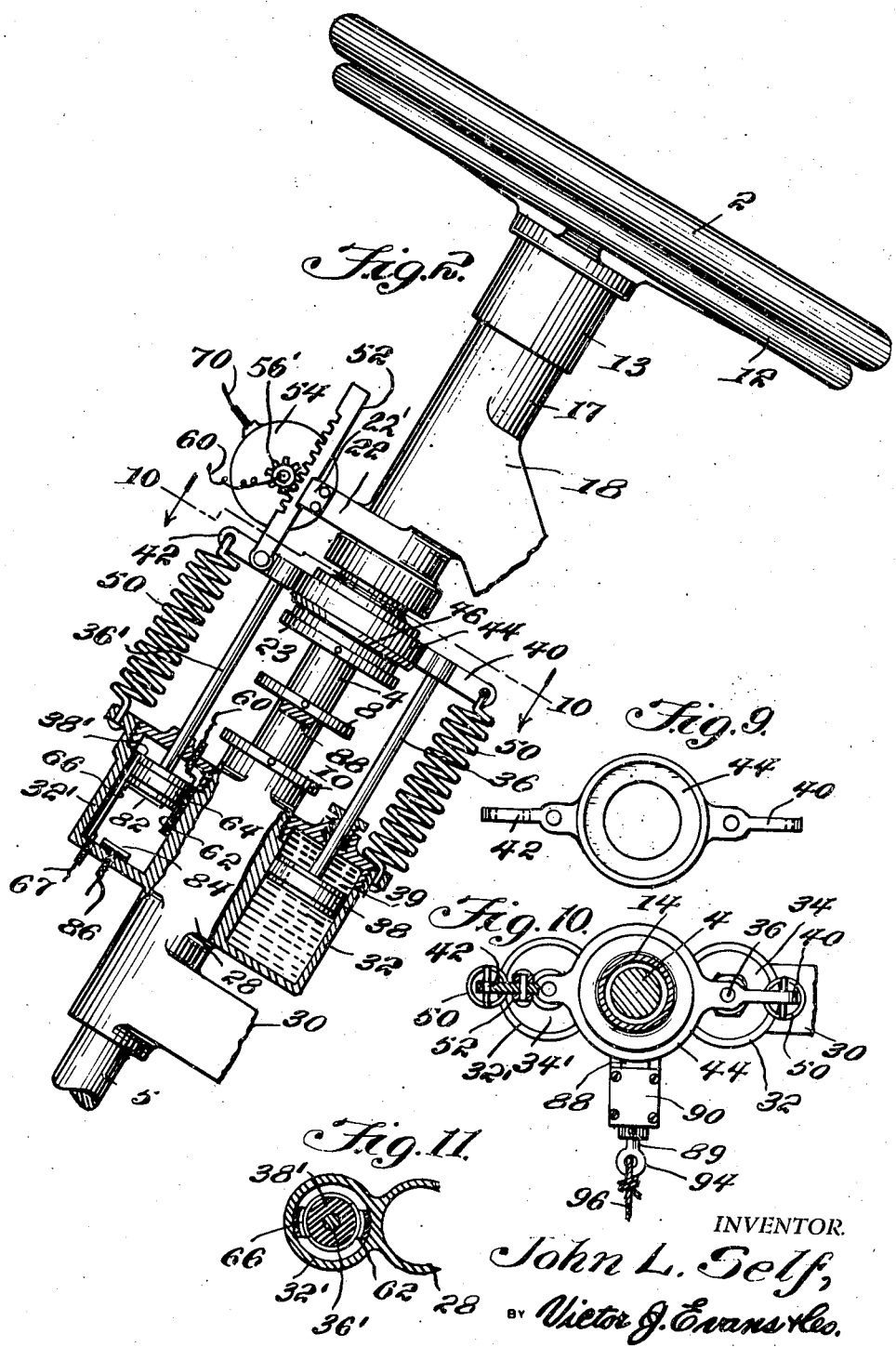
INVENTOR.
John L. Self,
BY Victor J. Evans & Co.
ATTORNEYS

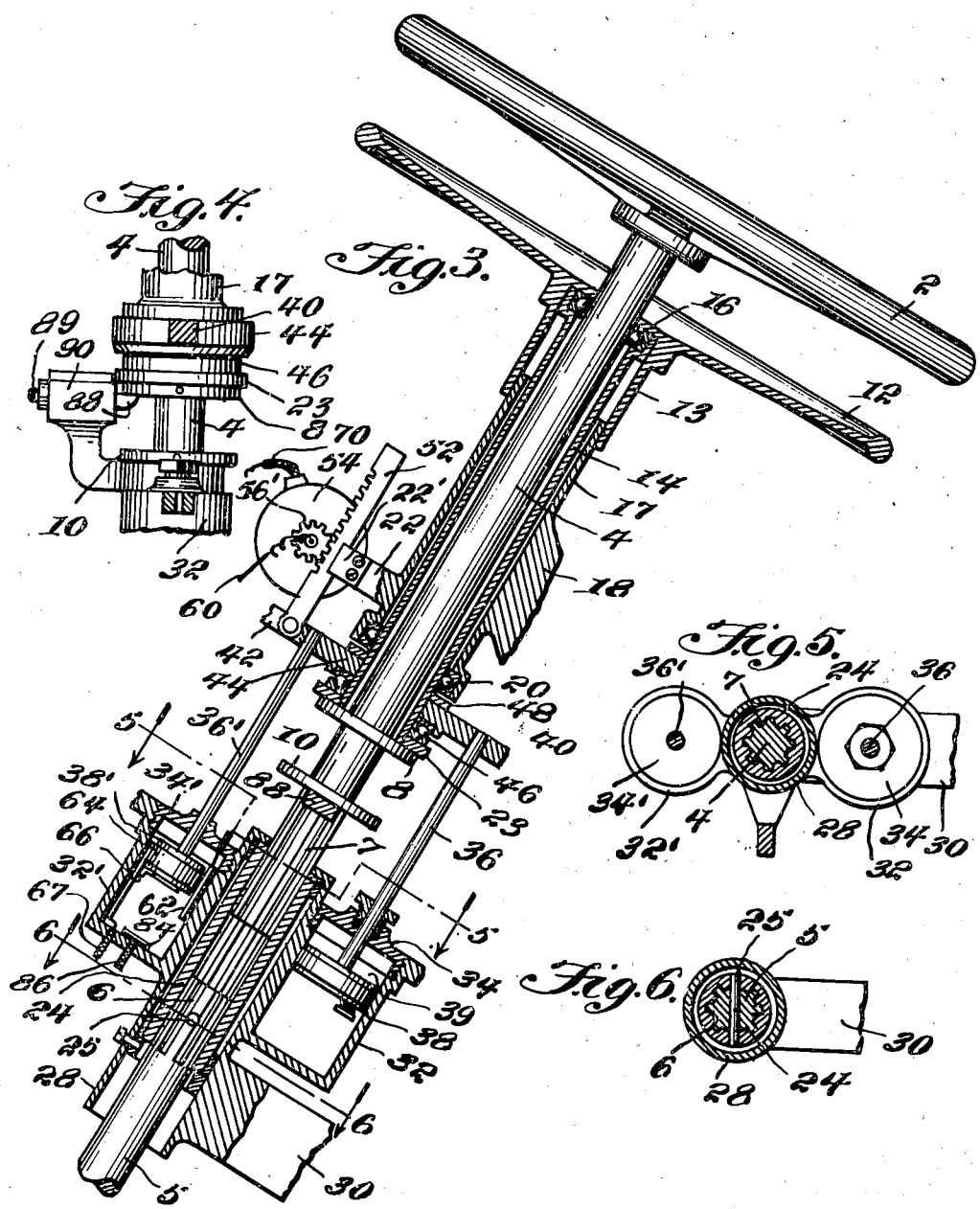

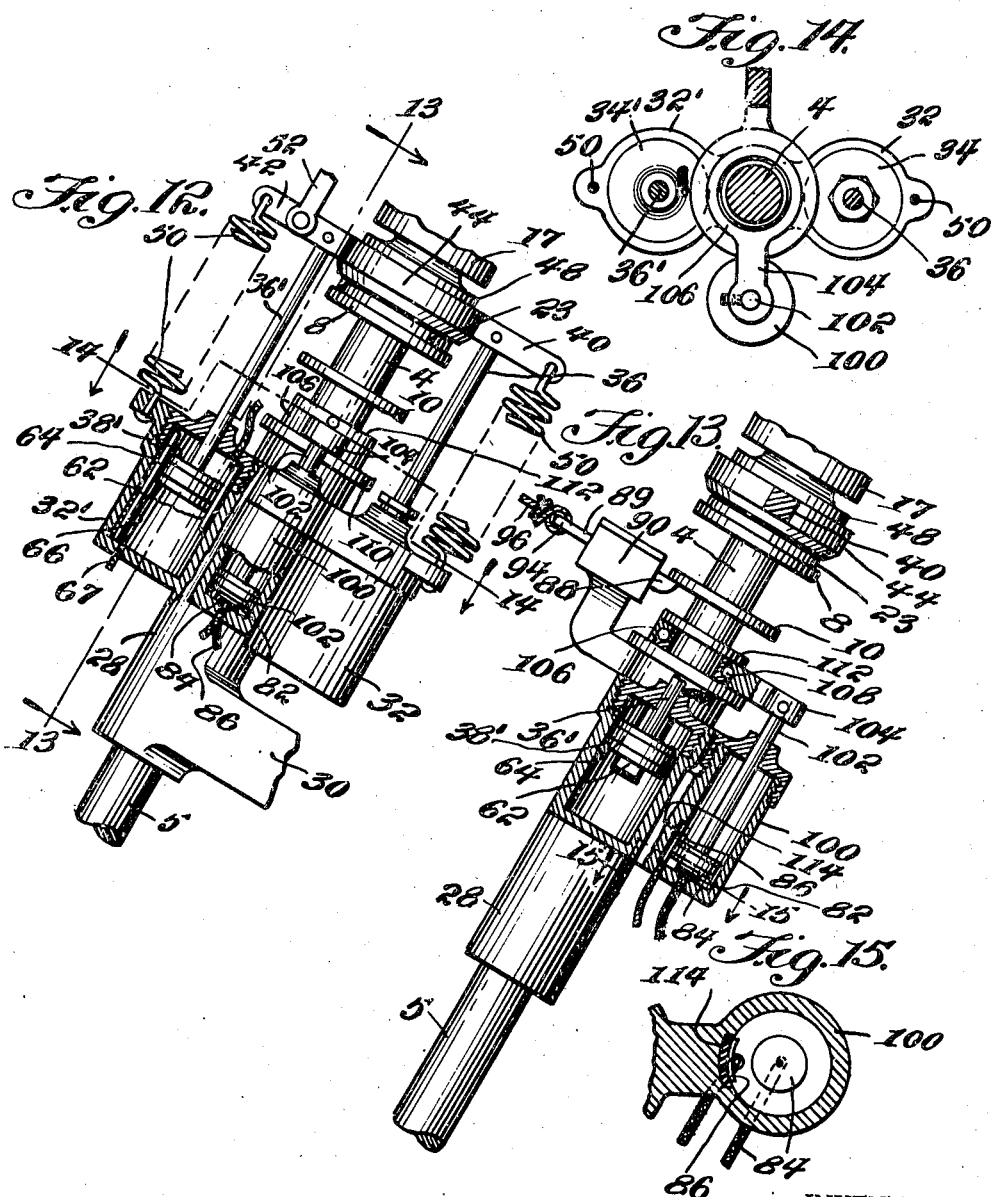

Patented May 24, 1949

2,471,244

UNITED STATES PATENT OFFICE 2,471,244

BRAKING SYSTEM FOR MOTORCARS

John Lee Self, Forest Hill, La.

Application November 21, 1946, Serial No. 711,331

4 Claims. (Cl. 188—163)

My present invention relates to an improved braking system for automobiles and more particularly to a substantially automatic brake applying means actuated by the reflex response of the driver to dangerous conditions.

According to my invention, I employ an auxiliary brake actuating control operable upon the conventional braking means of whatever type, by means of the operator reaching down with the first joint of his fingers hooking the brake wheel and pulling up on it or squeezing the brake wheel and steering wheel together as driving conditions warrant.

It is a known fact that the normal automobile driver will react to the presentation of conditions of danger by thrusting his feet forward to brace the body and at the same time pull on the steering wheel to increase the pressure of this bracing action.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a vertical sectional view of the steering wheel embodying my invention showing the parts in normal position.

Figure 2 is a partial side elevational view showing the steering wheel and brake actuating mechanism in applied position.

Figure 3 is a vertical sectional view showing the position of the parts when the steering wheel is used to actuate the braking mechanism.

Figure 4 is a detail view of the latch mechanism when the steering wheel and braking mechanism are at normal or off position.

Figure 5 is a transverse sectional view at line 5—5 of Figure 3.

Figure 6 is a transverse sectional view at line 6—6 of Figure 3.

Figure 7 is a detail view of the variable resistance for actuating the solenoid control of the brake piston.

Figure 8 is another detail view of the latch and control.

Figure 9 is a bottom plan view of the ring and arms mounted on the steering shaft.

Figure 10 is a transverse sectional view at line 10—10 of Figure 2; and

Figure 11 is a detail view showing the electrical connections in the circuit breaking cylinder.

Figure 12 is a partial elevational view of a modified control utilizing a separate piston and cylinder for the circuit breaker.

Figure 13 is a vertical sectional view thereof at line 13—13 of Figure 12.

Figure 14 is a horizontal sectional view at line 14—14 of Figure 12; and

Figure 15 is a horizontal sectional view at line 15—15 of Figure 13.

Referring now to the drawings in detail I have illustrated a steering wheel 2 having its shaft 4 and a separate extension 5. The ends of the shafts adjoining, are splined as at 6 and 7, and the collars 8 and 10 are provided in spaced relation on the shaft secured in suitable manner.

A brake wheel slightly smaller in diameter than the steering wheel is shown at 12 and is formed with an exterior cover ring 13 and a sleeve 14 with bearings 16 providing free movement of the sleeve and brake wheel relative to the shaft 4. A supporting sleeve 17 is positioned between the sleeve 14 and the cover ring 13, and the sleeve 17 is fashioned with a support or bracket 18 for rigidly securing the shaft and sleeves with relation to the vehicle body.

Ball bearings 20 provide for free movement of the sleeve 17 with relation to the sleeve 14 and the arm 22 is rigidly secured to the sleeve 17 as will be hereinafter described.

A lower sleeve 24 encloses the adjoining ends of the shafts 4 and 5 and this sleeve is inwardly splined for coaction with the splined ends of the shafts 4 and 5 and the shaft 5 is secured to the sleeve as by pin 26.

A casing 28 encloses the sleeve 24 and a bracket 30 provides secure attaching and supporting means for the lower ends of the shafts.

The casing 28 is also formed with opposed cylinders 32 and 32' having caps 34 and 34' enclosing piston rods 36 and 36' therein, and the ends of the piston rods in the cylinders are formed with piston heads 38 and 38'.

The cylinder 32 is filled with suitable cushioning fluid such as oil and the valve 39 permits the flow of oil through the piston head 38 as the head moves to its normal position in the cylinder, the jet 38a creating a buffer action when the braking mechanism is actuated.

The arms 40 and 42 on the ring 44 receive the free ends of the piston rods 36 and 36' and the ring 44 is secured in position upon the sleeve 14 by the bearing 46 and the flange 23.

Springs 50 connect the outer ends of the arms 40 and 42 to the outer portions of the cylinders and provide retracting means for the steering wheel, brake wheel, and allied mechanism.

The rack bar 52 on the arm 42 is operably connected with the rotary contact 56 in the resistance housing 54 to vary the contact with relation to the resistance wire 58. The rack bar 52 being retained in contact with the pinion 56' on the rotary contact 56 by means of a plate 22' fixed to the outer end of the arm 22 by suitable fasteners, thus the rack bar 52 operates in a guideway formed on one side by the housing 54 and on the opposite side by the plate 22'.

Wire 60 connects the resistance with a contact 62 located in the cylinder 32' and electrical contact is made with the contact 64 on the piston as the piston leaves its downward position. A connector 66 in contact with 64 creates a circuit through wire 67 to the battery 68 of the vehicle.

Wire 70 from the resistance 58 connects with a solenoid 72 having a core 74 operably connected with the piston rod 76 and the brake pedal 78 to apply the brakes through the master cylinder 80 with a degree of force as determined by the amount of current passed through the resistance.

A connector 84 is located on the inner wall of the base of the cylinder 32' and in normal position is contacted by a connector 82 on the piston 38' connected to the ignition circuit through wire 86. When the brakes are applied the piston leaves its normal position adjacent the base of the cylinder moving connector 84 out of contact with the connector 82 thus breaking the ignition circuit.

A latch 88 having a rod 89 is positioned within the cylinder 90 and is urged outwardly into position to contact the collar 10 as the shaft 4 is moved upward to maintain the brakes in applied position after the steering wheel has been used to actuate the mechanism, and the spring 92 which urges the latch out may be overcome to retract the latch by means of the eye 94 on the rod 89 to which is attached a wire or cord 96 leading to a knob, not shown, on the vehicle instrument panel. The latch 88 operates similar to a night latch having a tapered end which is engaged by the collar 10 forcing the latch rearwardly against the action of the spring 92 which will return the latch into latching position once the collar has cleared the tapered end of the latch.

In operation, as the vehicle moves forwardly with the ignition on, and the brakes off, the driver has his hands on the steering wheel. As his eye catches a signal indicating danger ahead, the normal reflex action is to brace the feet and pull on the steering wheel. As he pulls on the steering wheel of my invention, the wheel gives upwardly causing ring 8 to contact flange 23 raising the brake wheel 12 and mechanism with it. This movement is cushioned by the oil in the cylinder 32 and the springs are extended between the arms 40 and 42 and the cylinders 32 and 32'. The latch 88 will slip under the collar 10 and will hold the brakes in an "on" position, the movement of the piston 38' breaking the ignition circuit and thus stopping the engine. This action will move the rack bar to vary the resistance, the circuit to which has been closed by the engagement of the piston contact with the wall contact and the current passing through the resistance will energize the solenoid 72 to apply the brakes.

If the upward movement of the steering wheel has been sufficient to permit the latch to engage the collar 10, the brakes will remain applied until the wire 96 is tripped to release the latch whereupon the springs 50 will pull the arms 40 and 42 and the sleeve 14 down to return the brake wheel to spaced relation with the steering wheel as seen in Figures 1 and 3.

The above described operations, namely, the breaking of the ignition circuit and the application of the brakes will be substantially instantaneous requiring far less time than that required to describe the operation.

In the modified structure of Figures 12 through 15, I employ a pair of cylinders 32, and an additional ignition controlling circuit breaker cylinder 100 having a piston 102 operable therein and depending from a link 104 having a ring 106. Bearings 108 are provided between the ring and the shaft 7 and the ring is secured on the shaft between the collar 110 and the flange 112.

The contacts 84 and 86 operate as described, the contact 86 in the cylinder 100 being suitably insulated as at 114.

From the above description it will be apparent that I have utilized a normal reflex action of the driver of a vehicle to anticipate a voluntary action with an involuntary action, thus saving important seconds or fractions of seconds in the application of the brakes. These few seconds however, have often proved to be the difference between a collision and the ability of the driver to stop his vehicle.

The structure of my invention will also avoid the dire result often following the appearance of danger signals to the driver wherein the driver instead of applying the brakes, in panic applies his foot to, and presses harder on the accelerator.

Having thus fully described my invention, what I claim as new and desire to secure by Letters Patent is:

1. The combination with an automobile having a braking system operatable through the medium of a brake rod and a steering wheel, of inner and outer sleeves slidably supporting the steering wheel shaft, a resistance and an electrical circuit therefor including a solenoid operably connected with the brake rod, said resistance being mounted on the outer sleeve, a second inner sleeve on said steering wheel shaft, a housing fixed on said sleeve, anchoring arms fixed to said outer sleeve above said housing and resilient connections between the housing and the anchoring arms, a rack carried by said anchoring arms, a control for said resistance, a pinion on said control engageable with said rack whereby the movement of the rack will control the resistance for closing the circuit and varying the resistance in response to an upward thrust against the steering wheel.

2. The combination with an automobile having a braking system and a steering wheel having a steering shaft, of a variable resistance mounted with fixed relation to the steering shaft and an electrical circuit therefor, a solenoid in the circuit and a core for the solenoid having operable connections with the braking system, a housing on said steering shaft below said resistance, an anchoring means on said shaft above said housing, a pinion and rack connection between the anchoring means on the steering shaft and the resistance for closing the circuit and varying the resistance in response to an upward thrust against the steering wheel, and spring means connected between the housing and anchoring means for returning the upwardly thrust steering wheel to normal position.

3. The combination with an automobile having a braking system and a steering wheel having a steering shaft, of a variable resistance mounted with fixed relation to the steering shaft and an electrical circuit for the resistance normally open, a solenoid in the circuit and a core for the solenoid having operable connection with the braking system, a casing in encircling engagement with the shaft and cylinders mounted on opposite sides of said casing, pistons and rods for the cylinders, cross arms receiving the free ends of the piston rods one arm having a notched bar operably connected with said resistance to vary the same, and circuit closing means on one cylinder operable under sliding movement of the shaft in the casing responsive to an upward thrust against the steering wheel to close the circuit and vary the resistance.

4. The combination with an automobile having a braking system and a steering wheel having a steering shaft, of a sleeve secured to the vehicle, said steering shaft slidably mounted therein and movable in response to an upward thrust, a variable resistance mounted on the sleeve, a lower sleeve for the shaft, a casing for said lower sleeve and cylinders mounted on the opposite sides of said casing, pistons and rods therefor in the cylinders, cross arms receiving the ends of the rods, and springs connecting the cylinders and cross arms and urging the pistons downward in the cylinders, one cylinder comprising a fluid cushion against said shaft movement, and the other cylinder having circuit closing means therein operable upon upward movement of the piston, an electrical circuit including the resistance and the closing means, a solenoid in the circuit and a core operably connected with the braking system, and means on the cross arms varying the resistance in accordance with the force applied in the upward thrust against the steering wheel.

JOHN LEE SELF.

REFERENCES CITED

The following references are of record in the file of this patent:

UNITED STATES PATENTS

| Number | Name | Date |
| --- | --- | --- |
| 2,212,904 | Stone | Aug. 27, 1940 |
| 2,354,687 | Keith et al. | Aug. 1, 1944 |

FOREIGN PATENTS

| Number | Country | Date |
| --- | --- | --- |
| 458,938 | Germany | Apr. 23, 1928 |